US009455893B1

(12) United States Patent
Cham et al.

(10) Patent No.: US 9,455,893 B1
(45) Date of Patent: *Sep. 27, 2016

(54) METHOD AND SYSTEM FOR SERVICE AUTHENTICATION, NETWORK PREFERENCE, AND REPORTING LOGIC WITH MMS SERVICES

(71) Applicant: CSC HOLDINGS, LLC, Bethpage, NY (US)

(72) Inventors: Dev Cham, New Providence, NJ (US); Suman Pothuraju, Ozone Park, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/736,475

(22) Filed: Jun. 11, 2015

Related U.S. Application Data

(63) Continuation of application No. 13/835,686, filed on Mar. 15, 2013, now Pat. No. 9,088,892.

(60) Provisional application No. 61/667,370, filed on Jul. 2, 2012.

(51) Int. Cl.
*H04L 12/26* (2006.01)
*H04L 29/06* (2006.01)

(52) U.S. Cl.
CPC ....... *H04L 43/0876* (2013.01); *H04L 63/0876* (2013.01)

(58) Field of Classification Search
None
See application file for complete search history.

(56) References Cited

U.S. PATENT DOCUMENTS

| 7,293,107 B1 | 11/2007 | Hanson et al. |
| 7,746,864 B1 | 6/2010 | Asawa et al. |
| 7,962,126 B2 | 6/2011 | Haung et al. |
| 9,088,892 B1* | 7/2015 | Cham ............... H04W 12/06 |
| 2004/0087273 A1* | 5/2004 | Perttila ............. G01S 13/751 455/41.2 |
| 2004/0111476 A1 | 6/2004 | Trossen et al. |
| 2005/0207379 A1 | 9/2005 | Shen et al. |
| 2006/0025133 A1 | 2/2006 | Shaheen |
| 2010/0087212 A1* | 4/2010 | Shi ..................... H04W 4/12 455/466 |
| 2011/0032943 A1 | 2/2011 | Chen et al. |

OTHER PUBLICATIONS

Non-Final Office Action directed to U.S. Appl. No. 13/835,686, mailed Jan. 2, 2015: 10 pages.
Notice of Allowance directed to U.S. Appl. No. 13/835,686, mailed Mar. 18, 2015; 9 pages.
U.S. Appl No. 13/835,686, to Cham, et al., "Method and System for Service Authentication. Network Preference, and Reporting Logic with MMS Services," filed Mar. 15, 2013.

* cited by examiner

*Primary Examiner* — Brian Roberts
(74) *Attorney, Agent, or Firm* — Sterne, Kessler, Goldstein & Fox P.L.L.C.

(57) ABSTRACT

Methods and systems for multimedia messaging service (MMS) authentication over IP networks are disclosed. An access identifier records message corresponding to a user by a multimedia messaging service center (MMSC) forwarded by a server is received. Data from the access identifier records message including a mobile directory number, a framed IP address, access network information and a session ID is extracted and stored in a cache accessible to the MMSC. Network IP authentication is executed to determine that the user has a valid IP address. Client IP authentication of the user is executed to determine that the valid IP address is stored in the cache. A correspondence between the valid IP address and a mobile directory number of the user is determined. The user is authenticated for MMS over the IP network based on the correspondence.

20 Claims, 17 Drawing Sheets

RADIUS Accounting Request Trace for WiFi        700

Internet Protocol, Src: 10.10.10.100 (10.10.10.100), Dst: 20.20.20.200 (20.20.20.200)
User Datagram Protocol, Src Port: 36060 (36060), Dst Port: radius-acct (1813)
Radius Protocol
Code: Accounting-Request (4)
Packet identifier: 0x80 (128)
Length: 420
Authenticator: e8a1edfdea7de4bcdbb1a93944793431
[The response to this request is in frame 20]
Attribute Value Pairs
AVP: l=12 t=User-Name(1): 6316769816
AVP: l=6 t=NAS-IP-Address(4): 10.241.149.153
AVP: l=6 t=NAS-Port(5): 0
AVP: l=6 t=Service-Type (6): Outbound-User (5)   — 702
AVP: l=6 t=Framed-IP-Address(8): 173.251.36.214
AVP: l=22 t=Called-Station-Id(30): 216.255.102.144:4500   704
AVP: l=12 t=Calling-Station-Id(31): 6316769816 (MDN)
AVP: l=6 t=Acct-Status-Type(40): Start(1)
AVP: l=11 t=Acct-Session-Id(44): 3B34BAE1C                  706
AVP: l=21 t=Tunnel-Client-Endpoint(66): 167.206.20.248:1170 (WAN IP Address)
AVP: l=22 t=Tunnel-Server-Endpoint(67): 216.255.102.144:4500

FIG. 7A

RADIUS Accounting Request Trace for Cellular     708

Internet Protocol, Src: 10.10.10.100 (10.10.10.100), Dst: 20.20.20.200 (20.20.20.200)
User Datagram Protocol, Src Port: 32792 (32792), Dst Port: radius-acct (1813)
Radius Protocol
   Code: Accounting-Request (4)
   Packet identifier: 0x9b (155)
   Length: 286
   Authenticator: 95cbe5d55f954804f117287cb120b359
   [The response to this request is in frame 2]
   Attribute Value Pairs
      AVP: l=12  t=User-Name(1): 6316769838
      AVP: l=6  t=NAS-IP-Address(4): 167.206.20.156
      AVP: l=6  t=NAS-Port(5): 41117
      AVP: l=6  t=Service-Type(6):  Framed (2)          — 710
      AVP: l=6  t=Framed-IP-Address(8): 69.74.196.254
      AVP: l=6  t=Framed-IP-Netmask (9): 255.255.255.255
      AVP: l=6  t=Framed-MTU(12): 1500
      AVP: l=12  t=Vendor-Specific(26) v=Starent (8164)   — 712
      AVP: l=12 t=Calling-Station-Id (31): 6316769838 (MDN)

METHOD AND SYSTEM FOR SERVICE AUTHENTICATION, NETWORK PREFERENCE, AND REPORTING LOGIC WITH MMS SERVICES

CROSS-REFERENCE TO RELATED APPLICATION

This application is a continuation of U.S. patent application Ser. No. 13/835,686, filed on Mar. 15, 2013, entitled Method and System for Service Authentication, Network Preference, and Reporting Logic with MMS Services ("'686 application"), which is incorporated herein by reference in its entirety.

The '686 application in turn claims priority from U.S. Provisional Application No. 61/667,370, filed on Jul. 2, 2012, entitled Method and System for MMS Authentication over IP Network, which is incorporated herein by reference in its entirety.

FIELD

Embodiments relate to MMS authentication over cellular and IP networks.

BACKGROUND

Multimedia message services (MMS) were initially sent and received only by cellular data networks. In particular, a mobile device connected to a cellular network has been able to send MMS messages to another mobile device only over a cellular network. However, cellular networks have become overburdened with the vast number of MMS messages sent and received. In addition, there are occasions when sending an MMS message using cellular networks is less than desirable due to unavailability of the network and/or cost. Thus, there are strong incentives to offload MMS onto other networks.

What is needed is a system and method for authenticating MMS services over networks other than cellular networks.

BRIEF SUMMARY

Embodiments herein describe methods and systems for authenticating MMS services over cellular and IP networks.

According to some embodiments, a method for authenticating multimedia messaging service (MMS) over an IP network includes receiving an access identifier records message corresponding to a user by a multimedia messaging service center (MMSC) forwarded by a server. The method further includes extracting and storing data from the access identifier records message in a cache accessible to the MMSC including a mobile directory number, a framed IP address, access network information and a session ID. In addition, the method includes executing network IP authentication to determine that the user has a valid IP address. The method further includes executing client IP authentication of the user to determine that the valid IP address is stored in the cache. In addition, the method includes determining a correspondence between the valid IP address and a mobile directory number of the user. Further, the method includes authenticating the user for MMS over the IP network based on the correspondence.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The accompanying drawings, which are incorporated herein and form a part of the specification, illustrate embodiments of the present invention and, together with the description, further serve to explain the principles of the invention and to enable a person skilled in the pertinent art to make and use the invention.

FIG. 7A illustrates a RADIUS accounting request trace for wireless according to example embodiments.

FIG. 7B illustrates a RADIUS accounting request trace for cellular according to example embodiments.

DETAILED DESCRIPTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

History of MMS

Originally, Multimedia messaging services (MMS) was designed to be sent and received by a cellular network. However, according to the advantages demonstrated in the example embodiments, it is desirable to offload MMS from cellular data networks to other networks such as Wi-Fi networks and LTE (Long Term Evolution) networks.

MMS is a non-real-time delivery system capable of providing a rich set of content to subscribers. For example, MMS services may include extended short message services, news and entertainment content delivery such as text pages, pictures, ring tones and videos.

Although originally underutilized, MMS usage has now reached the point where it requires a large amount of bandwidth by cellular networks. In addition, in many locations, such as basements of buildings, cellular service may be lacking, but yet Wi-Fi may be available. Furthermore, a mobile device may be connected to a Wi-Fi network, yet roaming on another cellular network provider's network either domestically or internationally. The cost of sending an MMS using a cellular network may be prohibitive. Thus, there are many reasons why it may be desirable to offload MMS services onto other available networks.

According to example embodiments, MMS authentication and authorization may be provided on IP networks such as (Wi-Fi) and cellular data networks. Preferred MMS network selection is provided by a multimedia messaging service center. In addition, MMS service continuity may be achieved if a mobile device moves between different networks.

Network Environment

Figure 1:
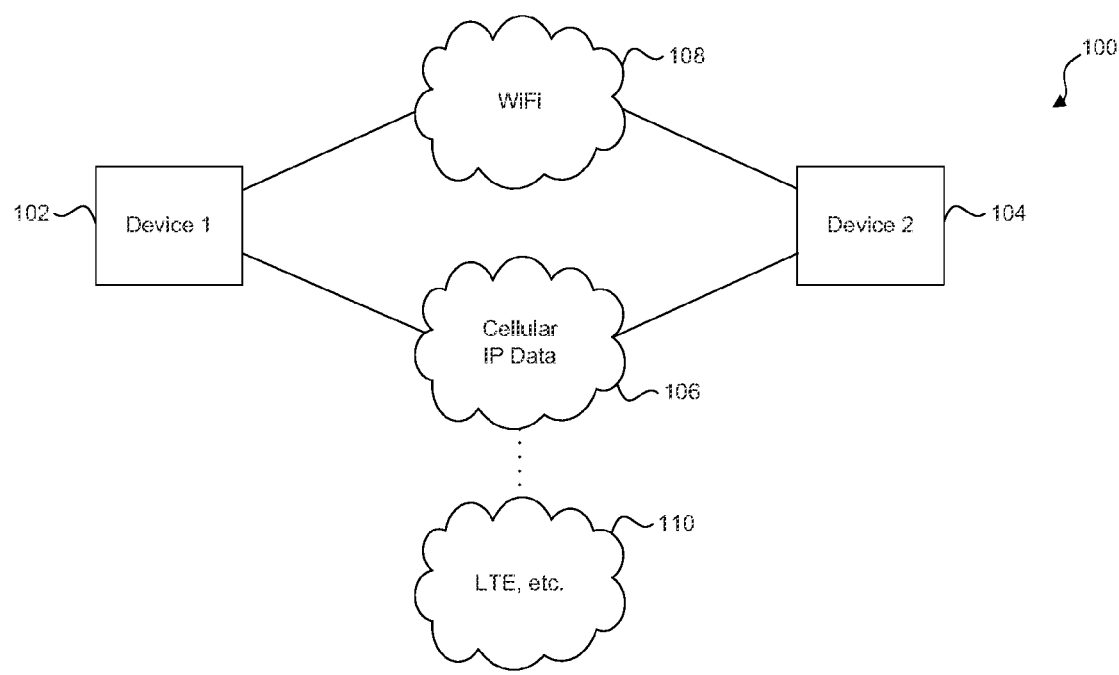
FIG. 1 illustrates a network environment according to example embodiments.

FIG. 1 is a diagram of an environment 100 for originating and terminating MMS messages according to example embodiments. Two devices, Device 1 102 and Device 2 104 may be connected to one or more networks including a cellular IP data network 106, an IP network such as a Wi-Fi network 108, and even other IP networks such as a Long Term Evolution (LTE) network 110. However, these networks are exemplary, and Device 1 102 and Device 2 104 may be connected to other networks that may be capable of being used to originate and terminate MMS messages.

Registration with MMSC

Figure 2:
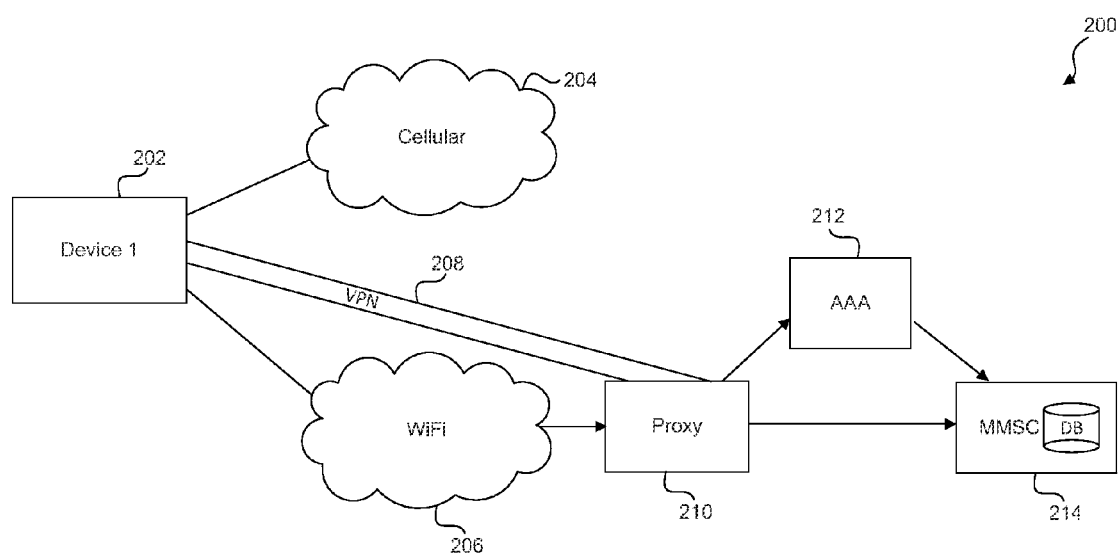
FIG. 2 illustrates device registration with a multimedia messaging service center (MMSC) according to example embodiments.

FIG. 2 shows registration with a Multimedia Message Service Center (MMSC) 200 according to example embodiments. As illustrated in FIG. 2, Device 1 202 may be connected to a cellular data network 204 as well as an IP network such as a Wi-Fi network 206. Device 1 202 may have two allocated IP addresses including a first IP address from a cellular data network 204, and a second IP address from a Wi-Fi network 206. Device 1 202 may establish and maintain a secure connection 208 by using VPN (virtual private network), TLS (transport layer security), etc. Device 1 202 may have a proxy server 210 forward access identifier records though an access identifier record, such as AAA server 212 to MMSC 214. Thus, according to example embodiments, MMSC may maintain a database having a copy of the first and second IP addresses for each device registered with the MMSC.

According to example embodiments, after registration an MMS message may be transported using HTTP or HTTPS from a device such as Device 1 202 to MIVISC 214 or from MMSC 214 to Device 1 202. The MMS message may be transported using a cellular data network or a Wi-Fi network using HTTP (hypertext transfer protocol) or HTTPS (hypertext transfer protocol secure). If HTTPS is used, root certification authentication may provide an additional layer for authorization security. The MMSC 214 may account for two or more IP addresses at a time: one IP address corresponding to a primary network and a second IP address corresponding to a secondary network. The MMSC 214 may store the IP addresses upon receipt of a RADIUS (access identifier records) feed.

Regarding the IP address corresponding to the first or primary network such as a Wi-Fi network, this IP address may be a secure user-agent routable IP address. VPN tunnel credentials may be required for proper authentication if a VPN is used. Regarding the IP address corresponding to the second or secondary network, this IP address may be assigned by the cellular data network by a proxy gateway (PGW) or home agent (HA), etc. The MMSC 214 may maintain a local copy of each of these IP addresses in a database for a registration period.

User-Agent Registration Over IP Network

Figure 2A:
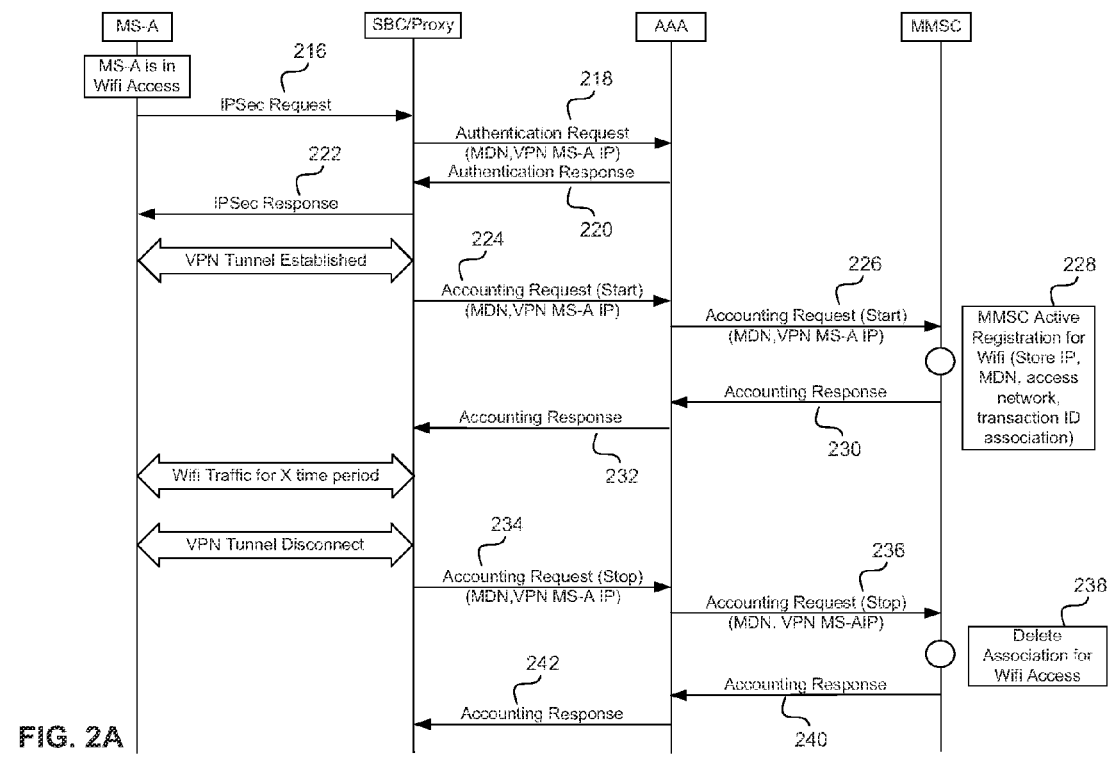
FIG. 2A illustrates a flow chart of multimedia messaging service (MMS) registration over Wi-Fi according to example embodiments.

FIG. 2A illustrates a flow chart providing additional details regarding user-agent registration over Wi-Fi according to example embodiments. In step 216, Device MS-A makes a secure network connection protocol, e.g., Internet Protocol Security (IPSec), request to a Session Border Controller/Proxy (SBC) 210 which forwards an authentication request to an AAA server 212 in step 218, which returns an authentication response back to the SBC 210 in step 220. In step 222, the SBC 210 returns an IPSec response to the mobile device thereby establishing a VPN tunnel. Then in step 224, the SBC 210 makes an accounting start request to the AAA server 212, which forwards the request to the MMSC 214 in step 226. In step 228, a SIP registration to SMSC occurs over the IP network. In other words, an active registration for the Wi-Fi network is created for the Device MS-A 102 and an IP address, a mobile directory number, access network and transaction ID are stored and associated with one another in a database of the MMSC 214. The mobile directory number may be a phone number or may also be a user name such as JohnDoe45678@domain.com. In step 230, the MMSC 214 returns an accounting response to the AAA server which then forwards the response to the SBC 210 in step 232. At this point, the Device MS-A is able to send traffic using the Wi-Fi network including MMS messages. Once the mobile device disconnects from or leaves the Wi-Fi network, the VPN tunnel is disconnected. In step 234, this causes the SBC 210 to send an accounting stop request to the AAA server 212, which forwards the accounting stop request to the MMSC 214 in step 236. In step 238, the MMSC 214 deletes the association in the MMSC database and in step 240 returns an accounting response to the AAA server 212, which forwards the response to the SBC 210 in step 242.

User-Agent Registration Over Cellular Network

Figure 2B:
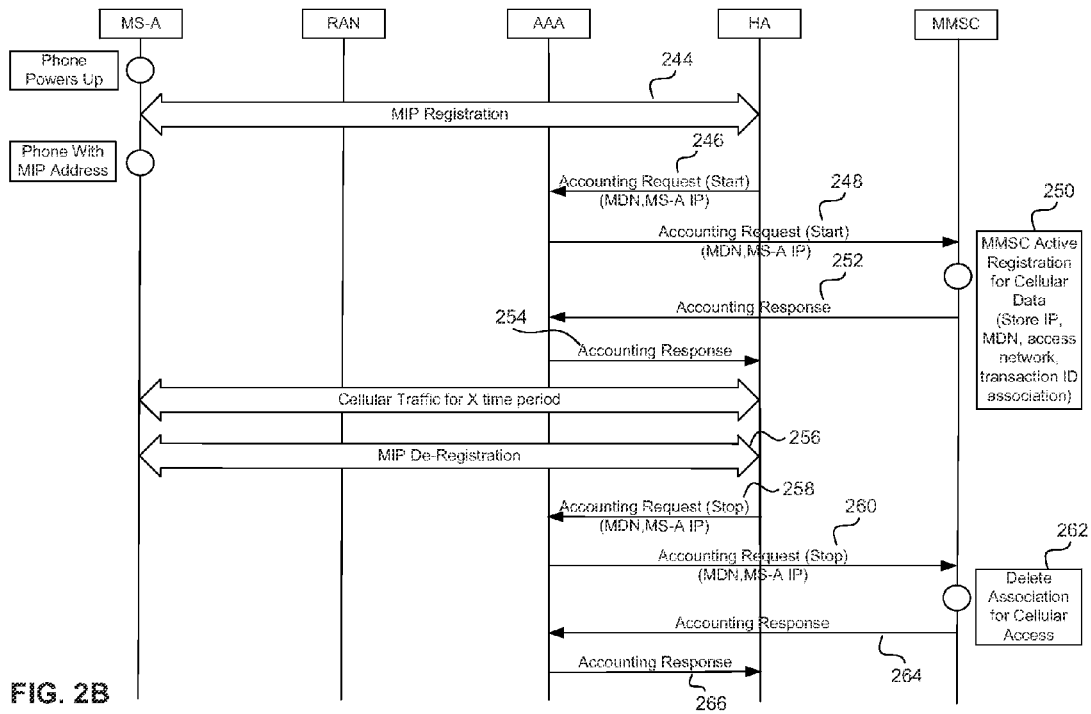
FIG. 2B illustrates a flow chart of MMS registration over cellular according to example embodiments.

FIG. 2B illustrates a flow chart providing additional details regarding MMS registration over a cellular data network according to example embodiments. As shown in FIG. 2B, a Device MS-A registers with a MMSC 214 on a cellular network. After Device MS-A powers on, Device MS-A may make a mobile IP registration request to a home agent (HA) in step 244. In step 246, the HA may then send an accounting request to an AAA server 212 which sends an accounting request to the MMSC 214 in step 248. In step 250, an active registration for the cellular network is created for the Device MS-A 102 and an IP address, a mobile directory number, access network and transaction ID are stored and associated with one another in a database of the MMSC 214. In step 252, the MMSC 214 may return an accounting response to the AAA server 212. In step 254, the AAA server 212 may then return an accounting response to the HA. At this point, the Device 1 102 is able to send/receive traffic using the cellular network including MMS messages. Once the Device MS-A disconnects from the cellular network, mobile IP de-registration begins in step 256. In step 258, the HA sends a stop request to the AAA server 212. In step 260, the AAA server 212 may forward a stop request to the MMSC 214 which then deletes the association in the database in step 262 and returns an accounting response to the AAA server 212 in step 264, which then forwards an accounting response to the HA in step 266.

User-Agent Authentication for MMS Deposit

Figure 3A:
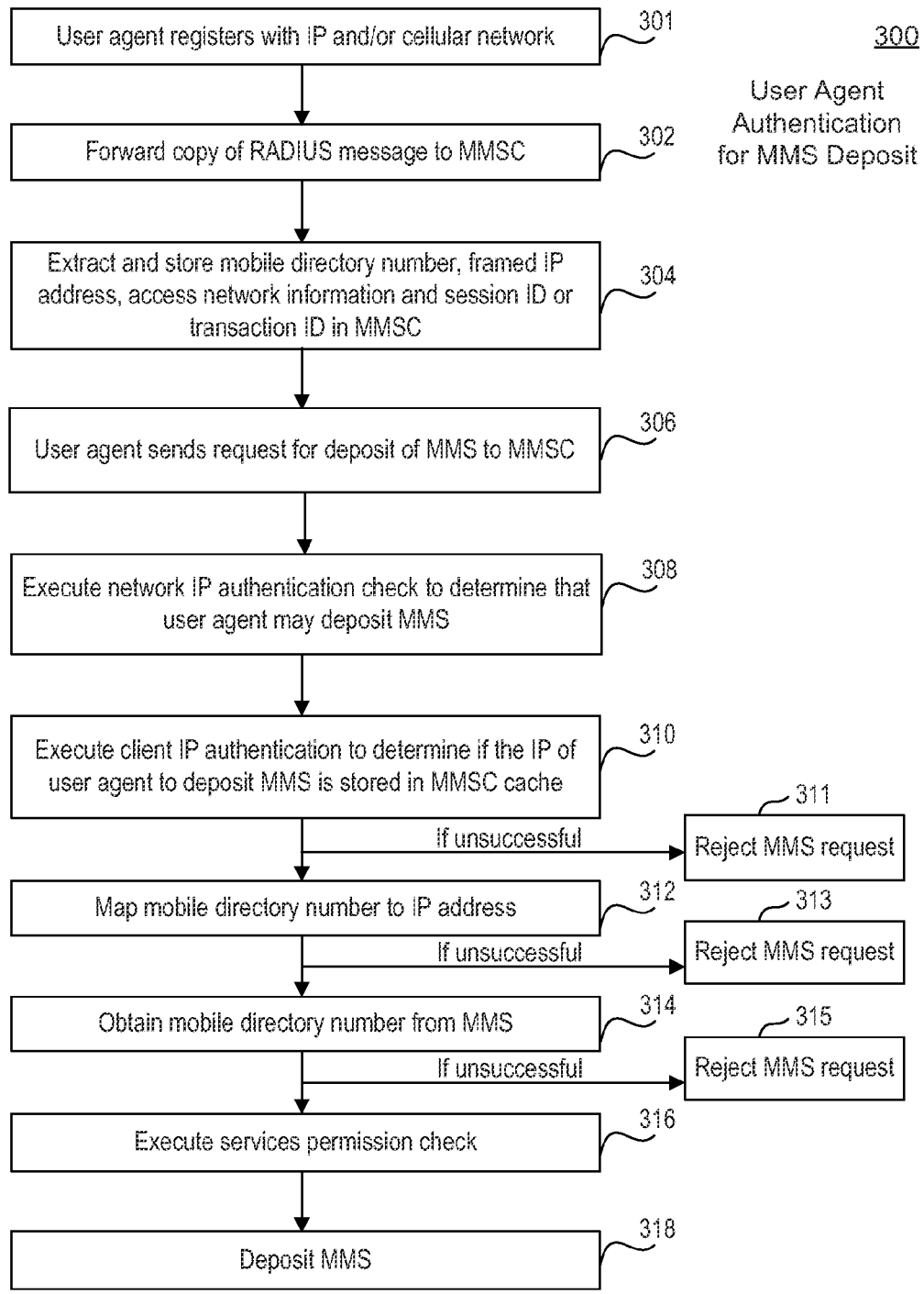
FIG. 3A illustrates a flow chart of user agent authentication for MMS deposit according to example embodiments.

FIG. 3A illustrates a flow chart of user-agent authentication for MMS deposit 300 according to example embodiments. As noted above, in step 301, Device 1 202 registers with a cellular or IP network. Device 1 202 may establish a secure connection, such as a VPN tunnel 208. The secure connection need not be a VPN tunnel and also may be established in other ways including use of a PDN (Packet Data Network) Gateway if the IP network is a Long Term Evolution (LTE) network. As provided in step 302, when Device 1 202 registers with a cellular or IP network, Device 1 202 may cause a copy of a RADIUS accounting message to be forwarded to the MMSC 214. In step 304, MMSC 214 may derive, extract and store parameters from the RADIUS message including a mobile directory number, a framed IP address assigned by a VPN server, access network information, as well as a session ID/transaction ID. In step 306, a user agent on Device 1 202 may send a request for deposit of an MMS to MMSC 214. A user-agent may prefer authentication and depositing MMS using a preferred network when more than one network is available by establishing a secure tunnel with the preferred network if the user-agent is not already connected.

After Device 1 202 submits a request for deposit, in step 308, MMSC 214 may determine that Device 1 202 is allowed to deposit MMS messages by executing a network authentication check by authorizing an IP address of Device 1 202 belonging to permitted IP subnets. MMSC 214 only authorizes the IP address if the IP address is within a range of IP addresses in a VPN IP pool. The pool of IP addresses may be considered to be similar to an access list of authorized IP addresses that is configured on the MMSC 214. In step 310, MMSC 214 may determine that a user agent of Device 1 202 is assigned an IP address that was received in a RADIUS message and that is stored in the MMSC database or cache. Thus, the MMSC 214 may cross-reference IP addresses which have been received in RADIUS messages during registration of devices to ensure that Device 1 202 has an IP address from either the cellular or Wi-Fi network. If the IP address is not found in the MMSC database, then in step 311 the MMS request is rejected. In step 312, the MMSC 214 may map or associate the IP address to a mobile directory number based on received RADIUS messages stored in the MMSC database thereby authenticating both the IP address and the mobile directory number. If the MMSC 214 is unable to map or associate the IP address to a mobile directory number, then in step 313, the MMS request is rejected. In step 314, the MMSC 214 may obtain a mobile directory number that an MMS message is being deposited from in a "from" header in a M-Send Req or a mobile directory number in an HTTP GET Req that the MMS message is being terminated to and may verify that the mobile directory number extracted from either the M-Send Req or the HTTP GET Req is identical in the MMSC database. If this is unsuccessful, then in step 315, MMS authentication fails and ends. In step 316, the MMSC 214 may execute a services permission check to ensure that the user is authenticated for MMS services and determine which services are permitted.

Next, in step 318 the MMSC 214 may begin an MMS deposit. If MMS authentication fails for any reason, the MMSC 214 will not store the MMS message.

Figure 3B:
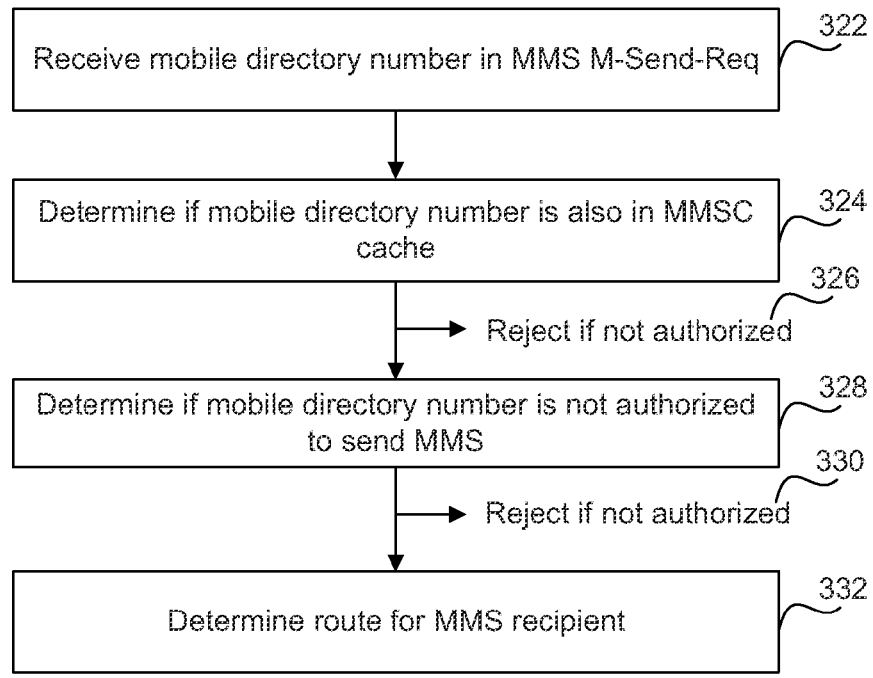
FIG. 3B illustrates an additional flow chart of user agent authentication for MMS deposit according to example embodiments.

FIG. 3B illustrates additional details regarding user-agent authentication for MMS deposit according to example embodiments. As provided in step 318, an a user agent may be authenticated for MMS deposit. In step 322, the MMSC 214 may receive a mobile directory number which is included in an MMS M-Send.Req message. Next, in step 324, the MMSC 214 may determine whether the mobile directory number is stored within the database. If the mobile directory number is not stored within the MMSC database, then the MMS deposit may be rejected in step 326. However, if the mobile directory number is stored within the MMSC database, then the MMSC 214 may determine whether the mobile directory number is authorized to deposit MMS messages in step 328. If the mobile directory number is not authorized to deposit MMS messages, then the MMS deposit may be rejected in step 330. However, if the mobile directory number is stored within the MMSC database and the mobile directory number is authorized to deposit MMS messages, then the MMSC 214 may determine a route for the MMS recipient in step 332. If a route may not be determined, then the MMS message may be sent to an inter-carrier gateway. However, the MMSC 214 may also perform a pre-cursor ENUM dip before attempting to send the MMS message to the inter-carrier gateway. If the MMSC 214 is unaware of a route for the MMS message, then the inter-carrier gateway may determine if the recipient of the MMS message is a valid recipient and route the MMS message.

User-Agent Authentication for MMS Retrieval

Figure 3C:
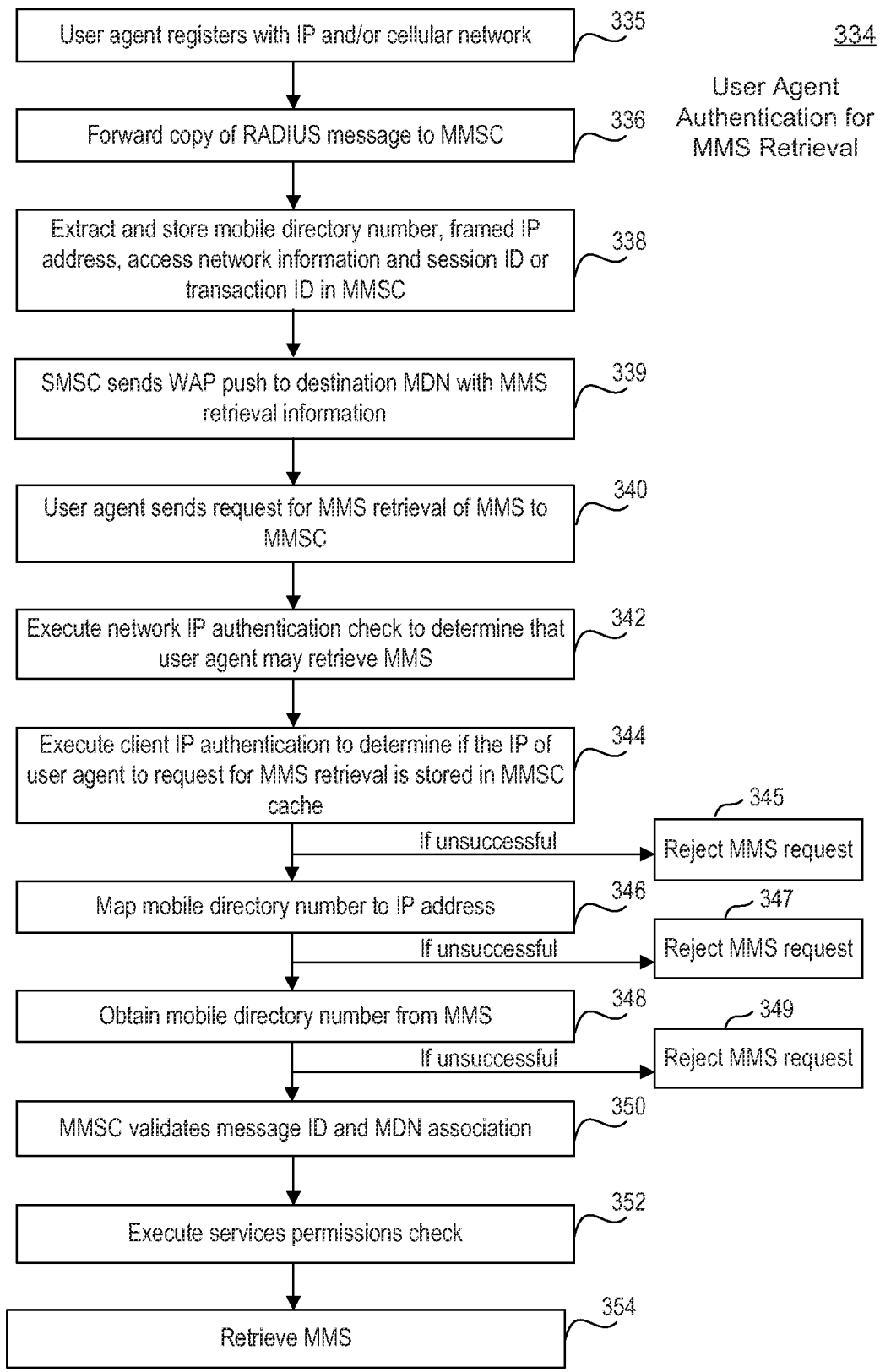
FIG. 3C illustrates a flow chart of user agent authentication for MMS retrieval according to example embodiments.

FIG. 3C illustrates a flow chart of user-agent authentication for MMS retrieval 334 according to example embodiments. As noted above, in step 335, Device 1 202 registers with a cellular or IP network. Device 1 202 may establish a secure connection, such as a VPN tunnel 208. The secure connection need not be a VPN tunnel and also may be established in other ways including use of a PDN Gateway if the IP network is a Long Term Evolution (LTE) network. As provided in step 336, when Device 1 202 registers with a cellular or IP network, Device 1 202 may cause a copy of a RADIUS accounting message to be forwarded to the MMSC 214. In step 338, MMSC 214 may derive, extract and store parameters from the RADIUS message including a mobile directory number, a framed IP address assigned by a VPN server, access network information, as well as a session ID/transaction ID. In step 339, SMSC may send a WAP push to a destination MDN with MMS retrieval information. In step 340, a user agent on Device 1 202 may send a request for an MMS retrieval to MMSC 214. A user-agent may prefer authentication and retrieving MMS using a preferred network when more than one network is available by establishing a secure tunnel with the preferred network if the user-agent is not already connected.

After Device 1 202 submits a request for retrieval, in step 342, MMSC 214 may determine that Device 1 202 is allowed to retrieve MMS messages by executing a network authentication check by authorizing an IP address of Device 1 202 belonging to permitted IP subnets. MMSC 214 only authorizes the IP address if the IP address is within a range of IP addresses in a VPN IP pool. The pool of IP addresses may be considered to be similar to an access list of authorized IP addresses that is configured on the MMSC 214. In step 344, MMSC 214 may determine that a user agent of Device 1 202 is assigned an IP address that was received in a RADIUS message and that is stored in the MMSC database or cache. Thus, the MMSC 214 may cross-reference IP addresses which have been received in RADIUS messages during registration of devices to ensure that Device 1 202 has an IP address from either the cellular or Wi-Fi network. If the IP address is not found in the MMSC database, then in step 345 the MMS request is rejected. In step 346, the MMSC 214 may map or associate the IP address to a mobile directory number based on received RADIUS messages stored in the MMSC database thereby authenticating both the IP address and the mobile directory number. If the MMSC 214 is unable to map or associate the IP address to a mobile directory number, then in step 347, the MMS request is rejected In step 348, the MMSC 214 may obtain a mobile directory number that an MMS message is being deposited from in a "from" header in a M-Send Req or a mobile directory number in an HTTP GET Req that the MMS message is being terminated to and may verify that the mobile directory number extracted from either the M-Send Req or the HTTP GET Req is identical in the MMSC database. If this is unsuccessful, then in step 349, the MMS request is rejected. In step 350, the MMSC may validate the message ID and MDN association. In step 352, the MMSC 214 may execute a services permission check to ensure that the user is authenticated for MMS services and determine which services are permitted.

Next, in step 354 a device may begin MMS retrieval. If MMS authentication fails for any reason, the MMSC 214 will not store the MMS message.

Figure 3D:
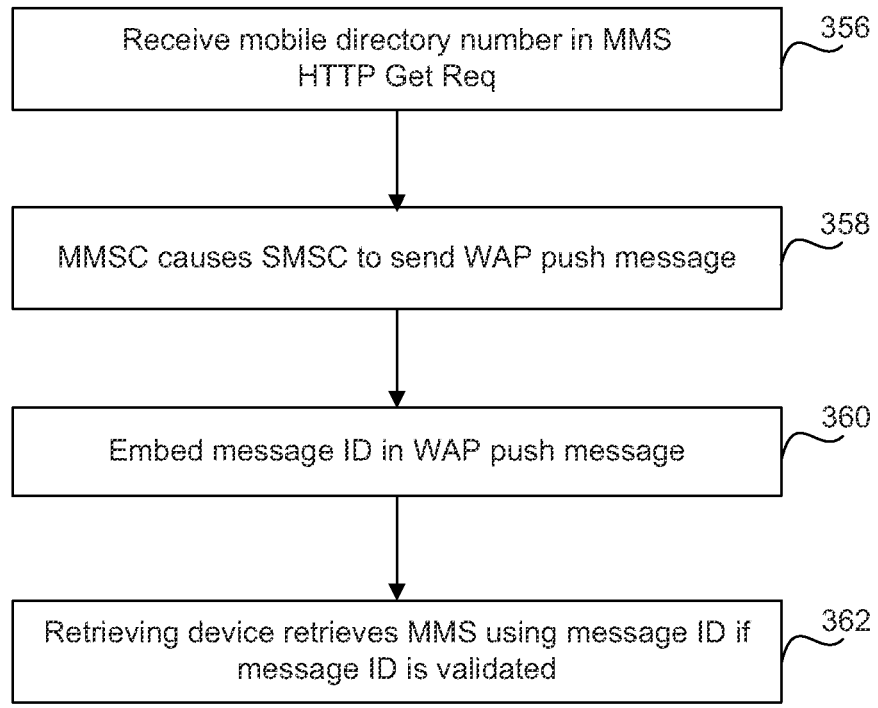
FIG. 3D illustrates an additional flow chart of user agent authentication for MMS retrieval according to example embodiments.

FIG. 3D illustrates additional details regarding user-agent authentication for MMS retrieval according to example embodiments. As shown in step 356, MMSC 214 may receive a mobile directory number in a HTTP Get Req message which is sent by a device retrieving an MMS. In step 358, the MMSC 214 causes an SMSC (Short Message Service Center) to send a WAP push message as noted in step 339 in FIG. 3C. According to step 360, a message ID may be embedded within the WAP push message. Thus, the MMSC 214 may determine that the device is authorized to retrieve the MMS message by determining that the MMS message which corresponds to the message ID was originally addressed to the device attempting to retrieve the MMS message. If the device is authorized to retrieve the MMS message, then the mobile directory number is authorized to retrieve the MMS message in step 362.

RADIUS Flushing

It is important to note that Device 1 202 may only deposit or retrieve an MMS message if connected to a network. As noted above, when Device 1 202 connects with a network, the MMSC 214 should receive a RADIUS start record for Device 1 202. The MMSC 214 must receive a RADIUS start record before the Device 1 202 may deposit or retrieve an MMS message. MMSC 214 may flush RADIUS records in order to delete out of date RADIUS records for Device 1 202. As an example, if a user-agent leaves an IP network and returns to the network while maintaining a persistent IP address, a new start record may be delivered to the MMSC 214 before purging a previous stop record. If this occurs, MMSC 214 may flush the previous start record using an accounting instance, transaction ID, or previous time stamp. According to an example embodiment, flushing may require checking with an access network to determine whether a persistent IP address is maintained between two different types of IP networks. Further, main access identifiers to be checked include (1) access network, (2) MDN, (3), WAN IP, (4) instance ID, and (5) timestamp. Start may be replaced with a new start and a new timestamp. In the event that a start does not exist, e.g. transaction ID 111A, because it has been replaced with a new start, e.g. transaction ID 222A, then the stop for the previous start (transaction ID 111) may be ignored by the MMSC 214. The MMSC 214 may not flush access identifier records based on a stop and a MDN. Thus, the MMSC 214 may utilize transaction IDs as well as timestamps.

By flushing RADIUS records, MMSC 214 may maintain active and accurate RADIUS records for Device 1 202. MMSC 214 analyzes any RADIUS stop messages received which include a mobile directory number, a framed IP address assigned by an access identifier record, access network information, as well as a session ID/transaction ID and timestamps in order to determine which RADIUS records to flush. Flushing RADIUS records may assist in a number of situations. For instance, a proxy controller may assign a persistent IP to Device 1 202. If a first RADIUS stop request is received after a second RADIUS stop request, then MMSC 214 may review session IDs in the stop requests to flush specific RADIUS records. In addition, access network information may indicate which network lost a connection and may be used to assist in flushing RADIUS records.

MMS Mobile Origination/Mobile Termination Over Cellular Network

The MMSC 214 is to prefer IP networks such as Wi-Fi over cellular networks. However, as an example, there may be intermittent availability of the Wi-Fi network, or there may be rapid mobility of Device 1 202 thereby causing sporadic registrations. There also may be low radio signaling strength indication which affects MMS services. In addition, there may be packet loss or frame loss causing MMS message delivery failure. However, reasons for MMS message delivery failure are not limited to these reasons. Thus, it is desirable to allow Device 1 202 to be able to originate and terminate MMS messages using both IP networks and cellular networks, while having Device 1 202 prefer Wi-Fi networks or other IP networks over cellular networks.

Figure 4:
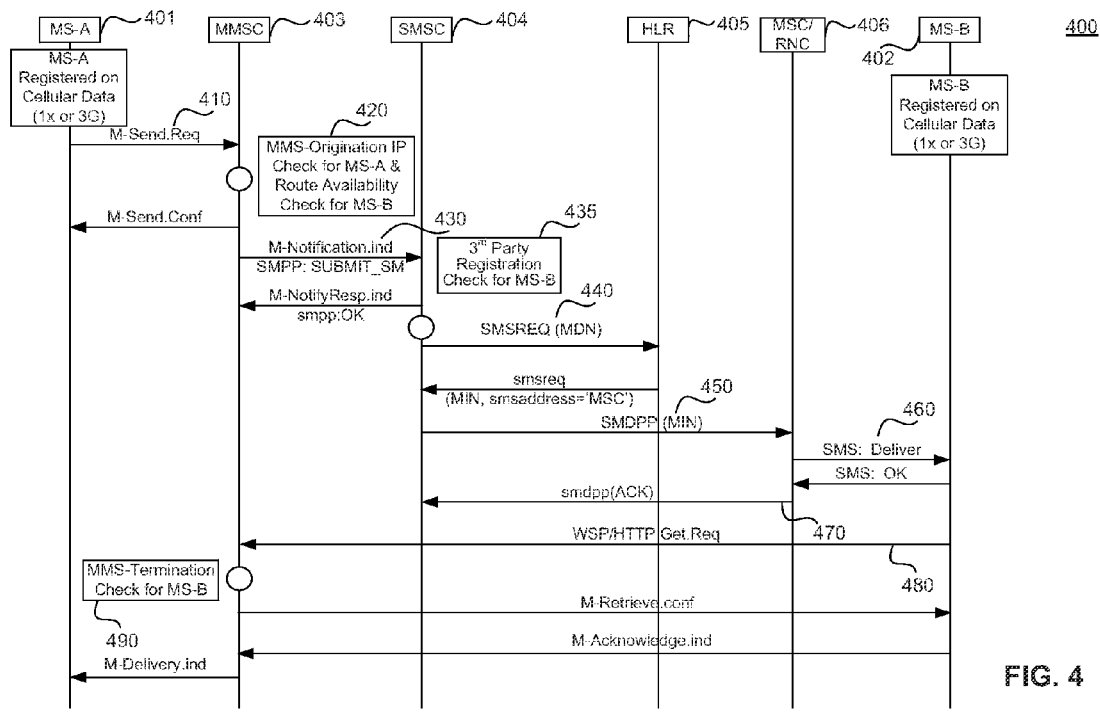
FIG. 4 illustrates a flow chart of MMS mobile origination/mobile termination over cellular according to example embodiments.

FIG. 4 illustrates a flow chart of MMS mobile origination/mobile termination over a cellular network 400 according to example embodiments. As shown in FIG. 4, Device MS-A 401 sends an MMS message to Device MS-B 402 which retrieves the MMS. Device MS-A 401 may be registered with a cellular network, such as a CDMA cellular network. However, Device MS-A 401 may also be registered with a GSM cellular network or any other suitable cellular network capable of MMS services. First, in step 410, Device MS-A 401 sends an M-Send.Req message to MMSC 403. In step 420, MMSC 403 executes an MMS Origination IP check to authenticate the IP address for Device MS-A 401 and determine route availability for Device MS-B 402. If MMSC 403 authenticates the IP address of MS-A 401 and determines route availability of MS-B 402, then MMSC 403 sends an MS-Send.Conf message to Device MS-A 401.

Then, in step 430, MMSC 403 sends an M-Notification.ind message to SMSC 404 which returns an M-NotifyResp.ind message to MMSC 403. In step 435, SMSC 404 executes a third party registration check for Device MS-B 402. In step 440, SMSC 404 sends an SMSREQ (Short Message Service Request) message with a mobile directory number to HLR 405. HLR 405 responds to SMSC 404 with a response message and provides information regarding a Mobile Switching Center (MSC) 406 and Radio Network Controller (RNC). In step 450, SMSC 404 then sends a Short Message Delivery Point to Point (SMDPP) message to MSC 406. In step 460, MSC 406 delivers an SMS message to Device MS-B 402 which returns an "OK" message to MSC 406 indicating acknowledgement of the SMS message. In step 470, MSC 406 returns an acknowledgement SMDPP message to SMSC 404. In step 480, Device MS-B 402 sends a WSP/HTTP Get.Req message to MMSC 403 to retrieve the MMS message. In Step 490, MMSC 403 executes an MMS-Termination Check to authenticate Device MS-B 402. If MMSC 403 is able to authenticate Device MS-B, then MMSC 403 sends an M-Retrieve.conf message to Device MS-B 402 which acknowledges by sending an M-Acknowledge.ind message. Finally, MMSC 403 sends an M-Delivery.ind message to MS-A 401 to indicate that MS-B 402 has retrieved the MMS message.

MMS Mobile Origination/Mobile Termination Over IP Network

Figure 5:
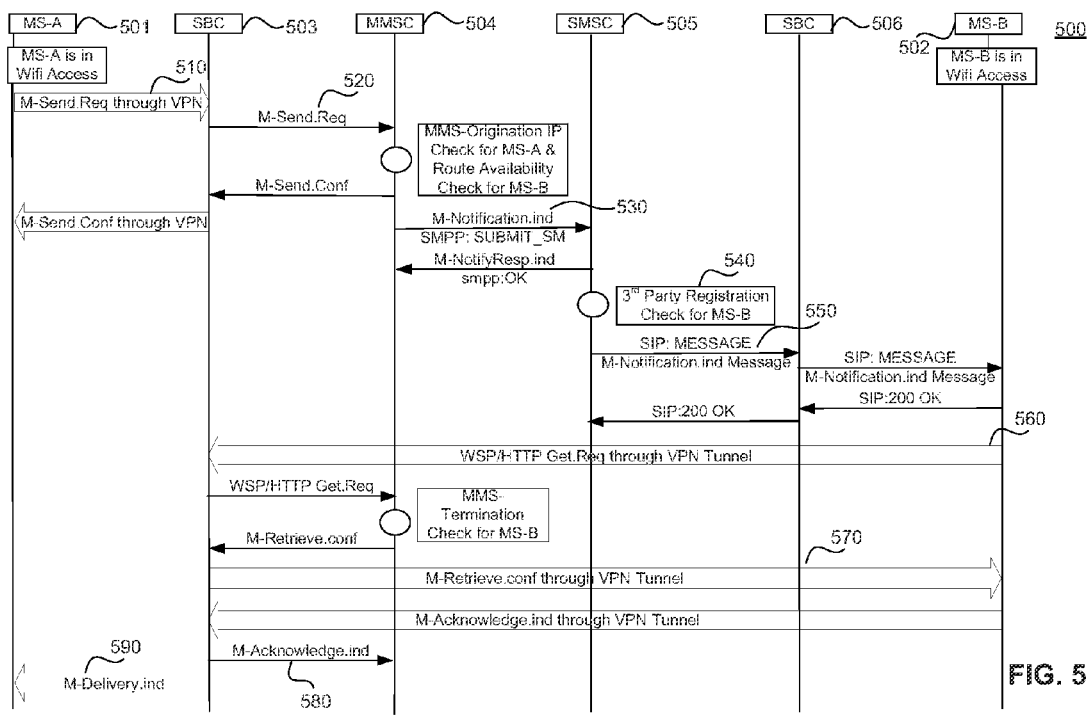
FIG. 5 illustrates a flow chart of MMS mobile origination/mobile termination over Wi-Fi according to example embodiments.

FIG. 5 illustrates a flow chart of MMS mobile origination/mobile termination over a Wi-Fi network according to example embodiments. As shown in FIG. 5, Device MS-A 501 sends an MMS message to Device MS-B 502 which retrieves the MMS. Device MS-A 501 may be registered with any IP network, such as a Wi-Fi network. However, Device MS-A 501 may also be registered with another IP network capable of MMS services. First, in step 510, Device MS-A 501 sends an M-Send.Req message to SBC 503 through a VPN tunnel. In step 520, SBC 503 sends an M-Send.Req message to MMSC 504, which executes an MMS-Origination IP check for Device MS-A 501 and then determines route availability for Device MS-B 502. If MMSC 504 authenticates the IP address of Device MS-A 501 and determines route availability of Device MS-B 502, then MMSC 504 sends an M-Send.Conf message to Device MS-A 501.

Then, in step 530, MMSC 504 sends an M-Notification.ind message to SMSC 505 which returns an M-NotifyResp.ind message to MMSC 504. In step 540, SMSC 505 executes a third party registration check for Device MS-B 502. In step 550, SMSC 505 sends a SIP message with an M-Notification.ind message to SBC 506, which then forwards this SIP message to Device MS-B 502. Device MS-B 502 returns a SIP:200 OK acknowledgement message to SBC 506, which also then sends a SIP:200 OK message to SMSC 505. In step 560, Device MS-B 502 sends a WSP/HTTP Get.Req. message through a VPN tunnel to SBC 503, which receives the message and sends a WSP/HTTP Get-.Req message to MMSC 504. MMSC 504 executes a MMS-Termination authentication check for Device MS-B 502, which then sends an M-Retrieve.conf message to SBC 503. In step 570, an M-Retrieve.conf message is sent by SBC 503 to Device MS-B 502 through the VPN tunnel, and Device MS-B 502 sends an M-Acknowledge.ind message to SBC 503. In step 580, SBC 503 sends an M-Acknowledge.ind message to MMSC 504. In step 590, SBC 503 sends an M-Delivery.ind message to Device MS-A 501 indicating that the MMS message was delivered to Device MS-B 502.

Incomplete MMS Deposit or Retrieval

According to further embodiments, if the MMSC 214 receives incomplete MMS content, then the MMSC 214 may check content length in the HTTP POST message of the M-Send.Req. As an example, the MMSC 214 may receive 224 Kbs instead of 512 Kbs. The content length is compared to the total number of bytes of MMS content to be received. If these content length values do not match, then the MMSC 214 rejects the MMS message and does not save the MMS. The MMS message sender is then notified to re-send the MMS message.

Duplicate MMS

According to further embodiments, a user may not receive an acknowledgement message such as a M-Send.Response message from the MMSC 214. If the user then redeposits the MMS, the MMSC 214 may identify the MMS as a duplicate of an MMS message previously received by comparing a unique message ID. Thus, the MMSC 214 may execute a message duplication check by using the transaction ID parameter which is received in an M-Send.Req message. If the MMSC 214 receives multiple MMS messages with the same transaction ID, then the MMSC 214 will only store a single MMS message which has a correct content-length parameter. The content-length parameter describes a size of the content which the MMSC 214 compares with an actual length received. The MMSC 214 may discard duplicate MMS messages having a same unique message ID after validating the content length. In addition, for MMS messages to be retrieved, the MMSC 214 may determine when the MMS message was deposited using the transaction ID. The MMSC 214 may disallow MMS message retrieval if a predetermined amount of time has elapsed since the MMS message was deposited to prevent duplicate MMS message termination. However, the MMSC 214 may allow MMS message retrieval if a predetermined amount of time has not elapsed since the MMS message was deposited.

MMS Reporting

According to further embodiments, it may be possible to record MMS service origination and termination network utilization. Thus, it may be possible to determine MMS traffic patterns, e.g., which cellular and Wi-Fi networks are utilized to send and receive MMS messages.

Figure 6:
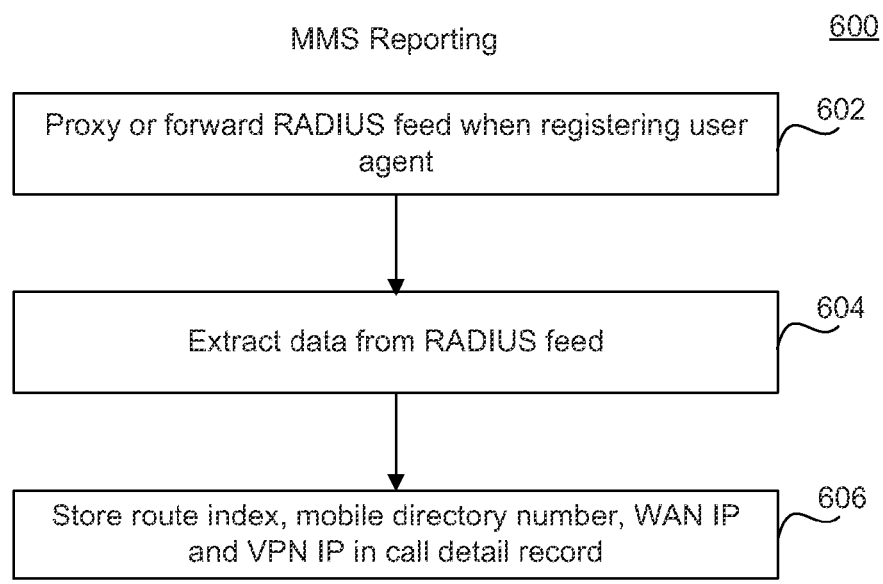
FIG. 6 illustrates MMS reporting according to example embodiments.

FIG. 6 illustrates MMS reporting 600 according to example embodiments. As shown in step 602, MMSC 214 may receive RADIUS feeds which are either proxied by an Authentication, Authorization and Accounting (AAA) server or forwarded when user agents register with networks. In step 604, MMSC 214 may extract certain data from the RADIUS feed and in step 606, MMSC 214 may store this data in a call detail record. As an example, the MMSC 214 may store a route index, a mobile directory number, a WAN IP and a VPN IP in a call detail record in an MMSC database.

A route index may specify a specific route path or interface used by an MMS message. As an example, a 3G cellular route ID may be "3", an LTE cellular route ID may be a "5" and a Wi-Fi route ID may be a "7."

A mobile directory number may provide a calling station ID and specify both a source and a destination. As an example, a mobile directory number may be "6315555555."

A WAN IP may be an originating subscriber WAN IP address of a source mobile directory number that successfully sent a mobile originated MMS or it may be a recipient subscriber WAN IP address of a destination mobile directory number for a successfully delivered mobile terminated MMS.

A VPN IP may be an originating VPN client IP or it may be a terminating VPN client IP.

A sample call detail record is shown in the table below.

highlighted in FIG. 7A. For instance, route index 702 is shown as "Outbound-User (5)." This indicates that the network is LTE. In addition, mobile directory number 704 is shown as "6316769816." WAN IP address 706 is shown as "167.206.20.248."

| Column | Max Length (bytes) | Field Type | Description |
|---|---|---|---|
| Event ID | 14 | Integer | Unique identifier for CDR, broken into three distinct parts. The first 2 digits represent the service the CDR originated from. The final 12 digits are an incrementing numeric value. |
| Record Type | 2 | Integer | 1 - Mobile Terminated<br>2 - Mobile Originated<br>8 - International Mobile Terminate<br>9 - International Mobile Originate<br>12 - Premium CSC Debit<br>13 - Premium Local CSC Debit<br>14 - Premium CSC Credit |
| Calling Number | 20 | String | Source MDN. |
| Called Number | 20 | String | Destination MDN. |
| Source Route ID | 3 | Integer | Route ID of source MDN. |
| Destination Route ID | 3 | Integer | Route ID of destination MDN. |
| Submit Timestamp | 20 | Date/Time | Timestamp that message was received. Format is YYYY-MM-DD HH:MM:SS. |
| Delivery Timestamp | 20 | Date/Time | Timestamp that message was delivered successfully. Format is YYY-MM-DD HH:MM:SS. |
| Message Length | 4 | Integer | Length of given message. |
| Priority | 1 | Boolean | Priority Indicator. |
| Price | 8 | Decimal | Rated price for CDR. Format is x.xx. |
| Provider ID | 2 | Integer | Unique identifier of content provider. Populated if CDR is associated with premium content, default value is 0. |
| Description | 100 | String | Description of given message. |
| Access Network | 10 | String | For SMS and MMS, will define whether or not the message was processed over the Cellular or Wi-Fi network. For SMS, this is determined by the SMSC, based on the source and destination route ID information. For MMS, this field will be populated by looking at the Service-Type AVP (6) of the subscriber's RADIUS record. Valid values are '2', '5', or ' '. If the Service-Type AVP is not provided in the RADIUS record, this field will be 'UNKNOWN'. For CSC, this field will be empty. |
| Service Endpoint | 40 | Decimal | For Cellular, will define the origination point code that the mobile originated message came from, or the point code that the mobile terminated message was successfully delivered to. For Wi-Fi, will define the IP address that the mobile originated message came from, or the IP address that the mobile terminated message was successfully delivered to. For CSC, this field will be empty. |
| Subscriber IP Address | 40 | Decimal | If an SMS or MMS message were processed using the Wi-Fi network, this field will be populated with the subscriber's IP address as defined in the Tunnel-Client-Endpoint AVP (66) of the subscriber's RADIUS record. If the SMS or MMS message was processed using the Cellular network, this field will be empty. For CSC, this field will also be empty. |
| Service | 2 | Integer | Platform CDR originated from. Current valid values are:<br>SMS - 1<br>MMS = 2<br>CSC = 3 |

FIG. 7A illustrates an example RADIUS accounting request trace 700 for Wi-Fi. As shown in FIG. 6, the RADIUS feed is forwarded to the MMSC 214, and specific data is extracted from the RADIUS feed in step 604 and stored in a database in step 606. The extracted data is FIG. 7B illustrates an example RADIUS accounting request trace 708 for cellular. As shown in FIG. 6, the RADIUS feed is forwarded to the MMSC 214, and specific data is extracted from the RADIUS feed in step 604 and stored in a database in step 606. The extracted data is highlighted in FIG. 7B. For instance, route index 710 is shown as "Framed (2)." In addition, mobile directory number 712 is shown as "6316769838."

Figure 8:
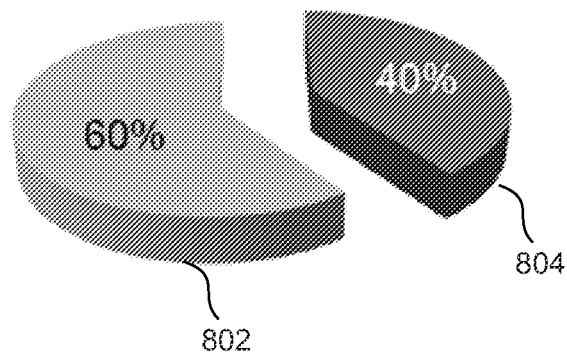
FIG. 8 illustrates a pie chart showing MMS traffic separation according to example embodiments.

As shown in FIG. 8, call detail records may be used to determine what percentage of messages are originated/terminated using a cellular network and what percentage of messages are originated/terminated using Wi-Fi. FIG. 8 shows a traffic separation pie chart 800 that indicates that 40% of messages are originated/terminated using the cellular network 802 and 60% of messages are originated/terminated using Wi-Fi 804.

Figure 9:
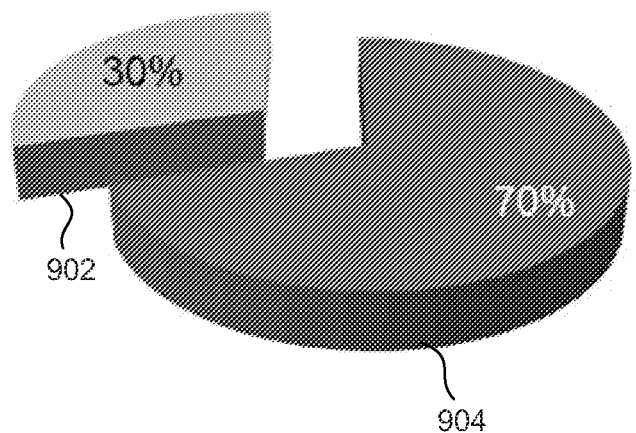
FIG. 9 illustrates a pie chart showing MMS wireless traffic separation according to example embodiments.

As shown in FIG. 9, call detail records may be used to determine what percentage of messages that are originated/terminated using Wi-Fi are originated/terminated using Cablevision Wi-Fi and what percentage of messages are originated/terminated using third party Wi-Fi. FIG. 9 shows a Wi-Fi traffic separation pie chart 900 that indicates that 70% of messages are originated/terminated using Cablevision Wi-Fi 902 and 30% of messages are originated/terminated using third party Wi-Fi 904.

MMS System Components and Example Computing Device

Figure 10:
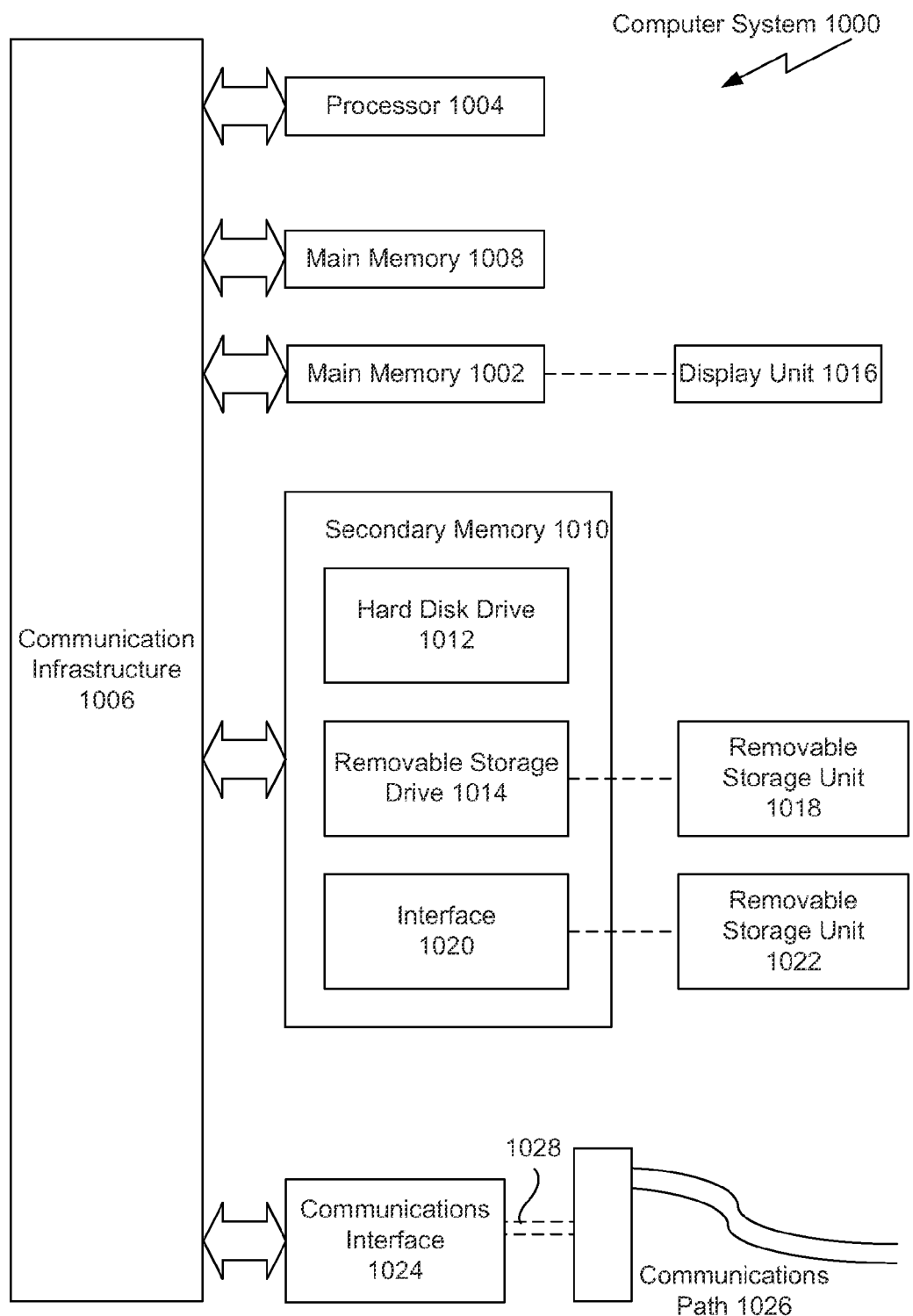
FIG. 10 is a diagram of an example computer system that can be used in embodiments.
Figure 11:
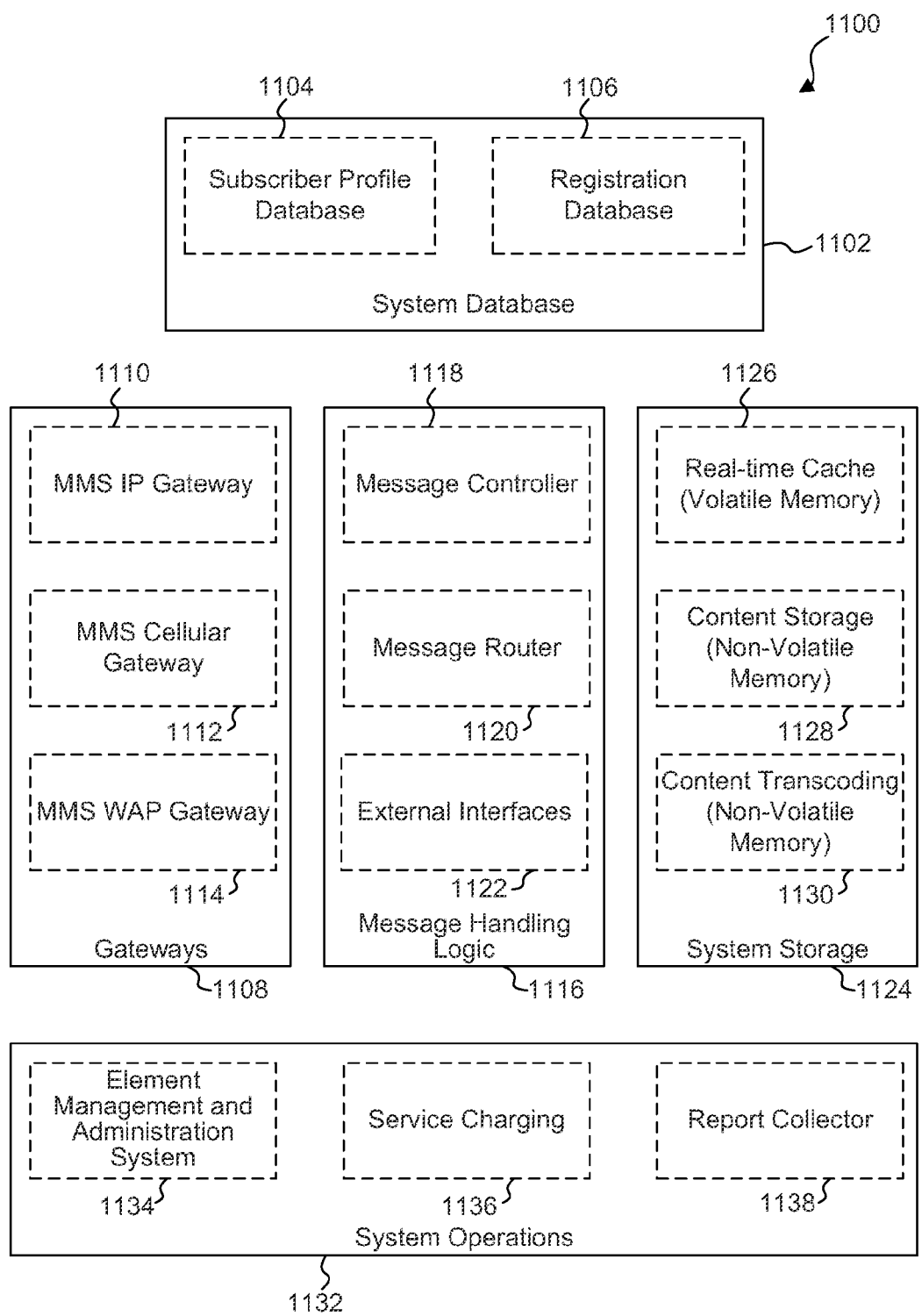
FIG. 11 illustrates a block diagram of components for originating and terminating MMS messages using cellular networks and IP networks, according to example embodiments.

FIG. 10 is a diagram of an example computer system that can be used in embodiments. FIG. 11 illustrates a block diagram 1100 of components for originating and terminating MMS messages using cellular networks and IP networks, according to example embodiments. According to example embodiments, the components described herein may include a system database 1102, which may include a subscriber profile database 1104 and a registration database 1106. In addition, the components may include gateways 1108, which may include an MMS IP Gateway 1110, an MMS Cellular Gateway 1112, and an SMS WAP Gateway 1114. The components may further include message handling logic 1116, which may include a message controller 1118, a message router 1120, and external interfaces 1122. Additionally, the components may include system storage 1124, which may include a real-time cache (volatile memory) 1126, a content storage (non-volatile memory) 1128, and a content transcoding (non-volatile memory) 1130. Furthermore, the components may include system operations 1132 which may include element management and administration system 1134, service charging 1136, and report collector 1138.

Various aspects of the example embodiments can be implemented by software, firmware, hardware, or a combination thereof. In addition, embodiments may be implemented as computer-readable code. Embodiments may be implemented via a set of programs running in parallel on multiple machines. For example, a MMSC carrying out MMS authentication 300 may be implemented in system 1000. Various embodiments of the invention are described in terms of this example system 1000.

Computer system 1000 includes one or more processors, such as processor 1004. Processor 1004 is connected to a communication infrastructure 1006 (for example, a bus or network).

Computer system 1000 also includes a main memory 1008, preferably random access memory (RAM), and may also include a secondary memory 1010. In accordance with implementations, user interface data may be stored, for example and without limitation, in main memory 1008. Secondary memory 1010 may include, for example, a hard disk drive and/or a removable storage drive. Removable storage drive 1014 may include a floppy disk drive, a magnetic tape drive, an optical disk drive, a flash memory, or the like. The removable storage drive 1014 reads from and/or writes to removable storage unit 1018 in a well-known manner. Removable storage unit 1018 may include a floppy disk, magnetic tape, optical disk, etc. which is read by and written to by removable storage drive 1014. As will be appreciated by persons skilled in the relevant art(s), removable storage unit 1018 includes a computer readable storage medium having stored therein computer software and/or data.

Computer system 1000 may also include a main memory 1002. Main memory 1002 may include, for example, cache, and/or static and/or dynamic RAM. Main memory 1002 may be separate from main memory 1008 or may be a part thereof. Main memory 1002 may be adapted to communicate with display unit 1016. Display unit 1016 may comprise a computer monitor or similar means for displaying graphics, text, and other data received from main memory 1002. In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 are in the form of signals which may be electronic, electromagnetic, optical, or other signals capable of being received by communications interface 1024. These signals are provided to communications interface 1024 via a communications path 1026. Communications path 1026 carries signals and may be implemented using wire or cable, fiber optics, a phone line, a cellular phone link, an RF link or other communications channels.

In this document, the term "computer readable storage medium" is used to generally refer to media such as removable storage unit 1018, removable storage unit 1022, and a hard disk installed in hard disk drive 1012. Computer readable storage medium can also refer to one or more memories, such as main memory 1008 and secondary memory 1010, which can be semiconductor memory (e.g. DRAMs, etc.). These computer program products are means for providing software to computer system 1000.

Computer programs (also called computer control logic) are stored in main memory 1008 and/or secondary memory 1010. Computer programs may also be received via communications interface 1024 and stored in main memory 1008 and/or secondary memory 1010. Such computer programs, when executed, enable computer system 1000 to implement the implementations as discussed herein. In particular, the computer programs, when executed, enable processor 1004 to implement the processes of the present disclosure, such as the steps in the methods discussed above. Accordingly, such computer programs represent controllers of the computer system 1000. Where implementations use software, the software may be stored in a computer program product and loaded into computer system 1000 using removable storage drive 1014, interface 1020, or hard drive 1012.

Embodiments may be directed to computer program products comprising software stored on any computer readable medium. Such software, when executed in one or more data processing device, causes a data processing device(s) to operate as described herein. Embodiments may employ any computer useable or readable medium. Examples of non-transitory computer readable storage media include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nano-technological storage devices, etc.). Other computer readable media include communication mediums (e.g., wired and wireless communications networks, local area networks, wide area networks, intranets, etc.).

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A non-transitory computer-readable storage medium having instructions stored therein, which when executed by a processor in a computing device cause the processor to perform operations, the operations comprising:
   receiving an access identifier records feed;
   extracting data from the access identifier records feed;
   storing the data comprising at least one of: a route index, a mobile directory number, or an Internet Protocol (IP) address in a call detail record associated with a multimedia message service (MMS) message in an accessible storage; and
   evaluating call detail records in the accessible storage to provide analytics regarding MMS usage.

2. The non-transitory computer-readable storage medium of claim 1, wherein a user agent requesting deposit of the MMS message is authenticated.

3. The non-transitory computer-readable storage medium of claim 1, wherein a user agent requesting retrieval of the MMS message is authenticated.

4. The non-transitory computer-readable storage medium of claim 1, wherein the IP address is at least one of: a wide area network (WAN) IP address or a virtual private network IP address.

5. The non-transitory computer-readable storage medium of claim 1, wherein the MMS usage utilizes a first network and a second network, the analytics comprise: determining a first network utilization.

6. The non-transitory computer-readable storage medium of claim 5, wherein determining the first network utilization comprises:
   determining a percentage of the MMS usage originating on the first network; and
   determining a percentage of the MMS usage terminating on the first network.

7. The non-transitory computer-readable storage medium of claim 6, wherein the first network is an IP network, and the second network is a cellular network.

8. The non-transitory computer-readable storage medium of claim 7, wherein the IP network comprises: a Wi-Fi network or a Long Term Evolution (LTE) network.

9. The non-transitory computer-readable storage medium of claim 1, wherein the data further comprises at least one of: an event ID, a record type, a submit timestamp, a delivery timestamp, a message length, a priority, a price, a provider ID, a description, an access network, a service endpoint, or a service type.

10. The non-transitory computer-readable storage medium of claim 1, wherein the analytics further comprise: determining MMS traffic patterns based on the MMS service usage.

11. A multimedia messaging service center (MMSC) system, comprising:
   one or more processors; and
   a memory coupled to a processor of the one or more processors, wherein the one or more processors are configured to:
   receive an access identifier records feed;
   extract data from the access identifier records feed;
   store the data comprising at least one of a route index, a mobile directory number, or an Internet Protocol (IP) address in a call detail record associated with a multimedia message service (MMS) message in an accessible storage; and
   evaluate call detail records in the accessible storage to provide analytics regarding MMS usage.

12. The system of claim 11, wherein a user agent requesting deposit of the MMS message is authenticated.

13. The system of claim 11, wherein a user agent requesting retrieval of the MMS message is authenticated.

14. The system of claim 11, wherein the IP address is at least one of: a wide area network (WAN) IP address or a virtual private network IP address.

15. The system of claim 11, wherein the MMS usage utilizes a first network and a second network, and to provide the analytics the one or more processors are configured to:
   determine utilization of the first network; or
   determine utilization of the second network.

16. The system of claim 15, wherein to determine utilization of the first network the one or more processors are configured to:
   determine a percentage of the MMS usage originating on the first network; and determine a percentage of the MMS usage terminating on the first network.

17. The system of claim 16, wherein the first network is an IP network, and the second network is a cellular network.

18. The system of claim 17, wherein the IP network comprises: a Wi-Fi network or a Long Term Evolution (LTE) network.

19. The system of claim 11, wherein the data further comprises at least one of: an event ID, a record type, a submit timestamp, a delivery timestamp, a message length, a priority, a price, a provider ID, a description, an access network, a service endpoint, or a service type.

20. The system of claim 11, wherein to provide the analytics the one or more processors are configured to: determine MMS traffic patterns based on the MMS service usage.

* * * * *

UNITED STATES PATENT AND TRADEMARK OFFICE
CERTIFICATE OF CORRECTION

PATENT NO. : 9,455,893 B1  
APPLICATION NO. : 14/736475  
DATED : September 27, 2016  
INVENTOR(S) : Cham et al.

Page 1 of 1

It is certified that error appears in the above-identified patent and that said Letters Patent is hereby corrected as shown below:

In the Claims

In Column 16, Line 44, please replace "at least one of a route" with --at least one of: a route--.

Signed and Sealed this
Twentieth Day of March, 2018

Andrei Iancu
*Director of the United States Patent and Trademark Office*